United States Patent
Bohanski

[15] 3,690,697
[45] Sept. 12, 1972

[54] HAND PROPELLED VEHICLES

[72] Inventor: John S. Bohanski, 401 Union St., Stevens Point, Wis. 54481

[22] Filed: May 25, 1970

[21] Appl. No.: 40,090

[52] U.S. Cl. .................280/247, 180/25, 180/775, 280/79.1, 280/92, 280/266, 280/282
[51] Int. Cl. ....................B62m 1/14, B62k 21/00
[58] Field of Search.....280/247, 266, 220, 235, 79.1, 280/221, 222, 47.24; 180/25, 775

[56] References Cited

UNITED STATES PATENTS

| | | |
|---|---|---|
| 2,070,095 | 2/1937 | Shepard, Jr. et al..280/79.1 X |
| 2,892,638 | 6/1959 | Stadden................280/247 X |
| 942,174 | 12/1909 | Hendricks.............280/47.34 |
| 2,809,847 | 10/1957 | Sperlich...............280/47.24 X |
| 3,173,708 | 3/1965 | Machielse et al. ....280/79.1 X |
| 1,875,647 | 9/1932 | O'Dwyer..................280/247 |
| 958,618 | 5/1910 | Franklin................280/266 X |
| 1,288,809 | 12/1918 | Benson...................280/266 X |
| 471,770 | 3/1892 | Miller....................280/235 X |
| 3,182,605 | 5/1965 | Brasher.................180/77 S X |
| 3,381,975 | 5/1968 | Bowman................280/247 X |
| 2,712,452 | 7/1955 | Hallowell et al..........280/79.1 |

FOREIGN PATENTS OR APPLICATIONS 22,790  11/1899  Great Britain..........280/47.25

Primary Examiner—Benjamin Hersh
Assistant Examiner—John P. Silverstrim
Attorney—Alter, Weiss & Whitesel

[57] ABSTRACT

This invention provides a vehicle which is propelled by a hand operated lever. The steering arrangement is attached to the operator's seat for turning a swivel wheel as the operator turns his body. A pinion and gear arrangement turns the swivel wheel to guide the vehicle in a direction in which a person driving the vehicle instinctively turns when confronted with an obstacle in his path.

1 Claim, 5 Drawing Figures

Patented Sept. 12, 1972
3,690,697
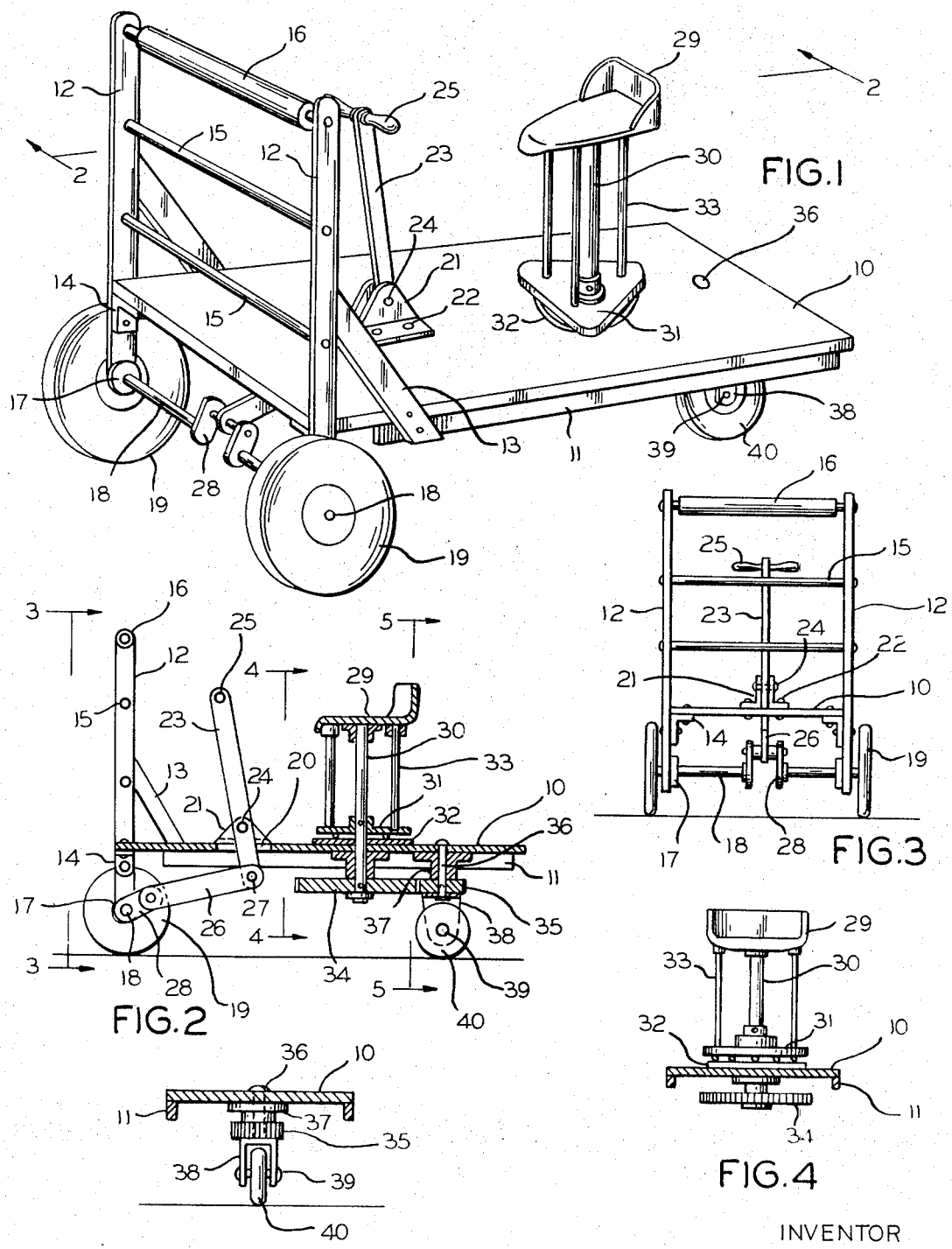
INVENTOR
JOHN S. BOHANSKI
BY
Alter, Weiss and Whitesel
ATTORNEYS

HAND PROPELLED VEHICLES

This invention relates to manually propelled vehicles, and more particularly to means of transporting people on streets or in industrial plants.

There are many times and places where it is necessary or desirable to transport small objects, parts or parcels in a limited area, especially as in industrial plants, for example. Very often small electrically powered vehicles are used for these purposes. However, they are not always appropriate because of cost, noise, or other conditions which preclude their use. A conventional solution continues to be to provide dollys or small wagons which are pulled or pushed about. However, it is manifest to anyone, that it is more desirable for an individual to be transported than to walk, especially if a substantial distance is to be covered.

A vehicle of this type should be easy to control. For example, if a driver is operating the vehicle down a crowded aisle, he should be able to control the vehicles by the body movements which naturally occur responsive to body reflexes. This way, accidents will be precluded by a naturally occurring response.

An object of my invention is to provide a transportation device which is manually propelled by the operator. Another object is to provide a vehicle which is directed in its path by the body movement of the operator. Here an object is to control the vehicle responsive to naturally occurring reflexes.

Another object of the invention is to provide a device of the character described, that may easily be manually manipulated and placed into any limited space when not in use.

Other and further objects of the invention will become more apparent as the description proceeds, when taken in conjunction with the drawings, in which:

FIG. 1 is a perspective view of an entirely assembled vehicle incorporating the invention;

FIG. 2 is a longitudinal, vertical, cross-sectional view of the assembled vehicle taken along line 2—2 in FIG. 1;

FIG. 3 is a front view of the vehicle taken at the line 3—3 in FIG. 2;

FIG. 4 is a front elevation view of the seat portion taken at the line 4—4 in FIG. 2; and FIG. 5 is a partly cross-sectional view of the steering portion of the device taken along the line 5—5 in FIG. 2.

Similar reference characters indicate corresponding parts and features throughout the several views. A platform 10 forms the body of the device. This platform may be constructed of any rigid material (such as wood, plywood, metal, or the like), and it may be of any shape, form, or contour. It is supported and made rigid by the vertical edge beams 11 disposed around the sides and rear portion of the platform 10. The platform 10 contains space for carrying parts or parcels; this space may be surrounded by side panels, (not shown).

The front or forward end of the platform 10 has two vertical members 12, 12 attached thereto. The braces 13 retain the members 12 in a vertical position. A pair of angular brackets 14 attach the vertical members 12 to the platform 10. A plurality of cross-braces or rods 15 extend from one vertical member 12 to the other. A handle or grip 16 is mounted at the top of the vertical members 12. This arrangement provides rigidity and a convenient means for moving the vehicle.

The lower ends of the vertical members 12 are provided with bearings 17 of any conventional design for supporting a crankshaft 18. The wheels 19 are attached to the ends of the crankshaft. Obviously, the wheels 19 may be of any suitable type for the support of the entire assembled device.

Centrally disposed within the platform 10 is a slot 20 (see FIG. 2). A pair of brackets 21 are attached at 22 to the platform 10. These brackets are disposed on both sides of the slot 20 for pivotally supporting an actuating lever 23 at the point 24. This lever 23 is shown as having hand grips 25 at its upper end. A linkage rod 26 is attached at the lower end of lever 23, at 27. The linkage rod 26 is connected to the crank throw 28, forming a part of the crankshaft 18.

A seat 29 supports the operator of the unit while he grips the handles 25 and actuates the lever 23 for revolving the crankshaft 18. This seat includes a saddle, which may be of any conventional design. The saddle is mounted on the upper end of a vertical shaft 30, supported by a plate 31, rotatably mounted onto a plate 32. The plate 32 is disposed on and attached to the upper surface of the platform 10, and it supports the plate 31 by means of ball bearings (see FIG. 4), or any other efficient manner.

I also show vertical rods 33 for stabilizing the position of the seat 29. The lower end of the shaft 30 is shown equipped with a gear 34 which gear engages a pinion 35. The pinion 35 is mounted on the end of a vertical shaft 36, extending through a bearing 37 engaging and attached to the lower face of the platform 10. The lower end of the vertical shaft 36 supports a yoke 38 equipped with an axle 39, onto which the wheel 40 is mounted. The gear 34 turns with a rotation of the seat 29. The engagement of the gear 34 with the pinion 35 causes the wheel 40 to swivel or pivot when the seat 29 is pivoted by the operator of the unit. The pinion reverses the direction of swivel relative to the direction of the seat swivel. Thus, since the swivel wheel is on the rear of the vehicle, the vehicle will turn in the direction in which the driver turns. The gear 34 and pinion 35 may be replaced by other suitable means, such as pulleys (not shown) equipped with belt.

From the above description, it should be apparent that the vehicle is propelled when the operator sitting on the seat 29 moves the lever 23 thereby revolving the crankshaft 18. The swivel movement of the seat 29 by the operator, pivots the wheel 40 for steering the vehicle along its path. The handle or grip 16 enables a manipulation of the unit when not in use.

Although I have shown a specific construction and arrangement of the parts and features constituting my invention, I am fully cognizant of the fact that many changes may be made in the parts and features. Therefore, the attached claims are to be construed to cover all equivalents following within the scope and spirit of my invention.

I claim:

1. A factory truck comprising an elongated truck platform having at least two corners near one end thereof, a pair of vertical members attached to each of said corners and extending above and below said platform, bracing means for stabilizing said vertical members, handle means connected between the ends of said vertical members above the platform to manipulate the truck when it is not being driven, crankshaft axle means having a centrally located crank throw, said axle extending between the other ends of said vertical members below said platform, a pair of wheels, each of said wheels being rigidly mounted on an opposite end of and turning with said crankshaft, a third castor wheel swivel mounted on the other end of said platform, means for turning said crank shaft comprising a single hand operated lever means, said single hand operated lever means being coupled to said crank throw via linkage means for turning said crank responsive to reciprocal movement of the top of said hand operated lever means in the direction of travel of said truck, said single hand operated lever means moving through a slot in said platform, bracket means attached to the surface of said platform, means for pivotally coupling said hand operated lever means onto said bracket means so that a mechanical advantage is obtained by the user of said lever means, a swivel seat mounted on said platform positioned so that a person sitting in said seat can operate said lever means, a pair of plates with a ball bearing race between them, one of said plates being attached to said platform, the other of said plates carrying said swivel seat, and means geared to turn said third wheel wherein said gearing means comprises a gear attached to said seat, a meshing pinion gear fixedly attached below said platform to a pivot pin, said pivot pin being pivoted in said platform, said third wheel being fixedly attached to said pivot pin directly below said pinion gear so that said vehicle is guided in the direction in which an operator sitting in the seat instinctively swivels the seat as he turns to avoid an obstacle in the path of said truck.

* * * * *